(12) United States Patent
Takahama et al.

(10) Patent No.: US 11,711,475 B2
(45) Date of Patent: Jul. 25, 2023

(54) AUTOMATIC COPY OPERATION BASED ON TIMING OF DETECTION OF DOCUMENT AND RECODING MEDIUM

(71) Applicant: KONICA MINOLTA, INC., Tokyo (JP)

(72) Inventors: Hidekazu Takahama, Nagoya (JP); Hiroyuki Suzuki, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 137 days.

(21) Appl. No.: 17/505,130

(22) Filed: Oct. 19, 2021

(65) Prior Publication Data
US 2022/0124210 A1    Apr. 21, 2022

(30) Foreign Application Priority Data
Oct. 21, 2020    (JP) .................................. 2020-176607

(51) Int. Cl.
*H04N 1/00*    (2006.01)

(52) U.S. Cl.
CPC ..... *H04N 1/00694* (2013.01); *H04N 1/00477* (2013.01); *H04N 1/00689* (2013.01); *H04N 1/00708* (2013.01); *H04N 1/00721* (2013.01); *H04N 1/00896* (2013.01)

(58) Field of Classification Search
None
See application file for complete search history.

(56) References Cited

U.S. PATENT DOCUMENTS

2016/0191735 A1* 6/2016 Mutsuno ............ H04N 1/00689
                                                    358/1.14
2021/0084179 A1* 3/2021 Odani ................ H04N 1/00689

FOREIGN PATENT DOCUMENTS

| JP | H0563904 A | 3/1993 |
|----|------------|--------|
| JP | H08152813 A | 6/1996 |
| JP | 2006203874 A | 8/2006 |

* cited by examiner

*Primary Examiner* — Eric A. Rust
(74) *Attorney, Agent, or Firm* — Buchanan Ingersoll & Rooney PC

(57) ABSTRACT

An image forming apparatus includes a document tray in which a document is to be set, a medium container that contains a recording medium, a document detection sensor that detects a document set in the document tray, a medium detection sensor that detects a recording medium contained in the medium container. A hardware processor executes a copy operation of forming an image obtained by scanning a document set in the document tray on a recording medium, determines to automatically execute the copy operation in case an elapsed period of time between a document detection time when a document is detected by the document detection sensor and a medium detection time when a recording medium is detected by the medium detection sensor is equal to or smaller than a predetermined operation period of time, and automatically executes the copy operation based on determination of automatic execution of the copy operation.

17 Claims, 10 Drawing Sheets

2020-176607 filed on Oct. 21, 2020, is incorporated herein by reference in its entirety.

AUTOMATIC COPY OPERATION BASED ON TIMING OF DETECTION OF DOCUMENT AND RECODING MEDIUM

The entire disclosure of Japanese patent Application No. 2020-176607 filed on Oct. 21, 2020, is incorporated herein by reference in its entirety.

BACKGROUND

Technological Field

The present invention relates to an image forming apparatus, an automatic copy method and a non-transitory computer readable recording medium encoded with an automatic copy program. More specifically, the present invention relates to an image forming apparatus that copies an image formed on a document to a recording medium and an automatic copy method executed in the image forming apparatus and a non-transitory computer readable recording medium encoded with an automatic copy program.

Description of the Related art

An image forming apparatus such as an MFP (Multi Function Peripheral) has a copy function of forming an image of image data obtained by scanning of an image formed on a document on a recording medium. In the case where the MFP 100 executes the copy function, the user is required to perform an operation of setting a document in a document tray, changing a set value for designating a recording medium on which an image is to be formed by operating an operation panel and pressing a start key. It is desired to reduce a user's operation of causing the MFP to execute the copy function.

Japanese Patent Laid-Open No. 2006-203874 describes an image output method that includes an image scanning step of scanning image data, an image output step of outputting an image using the read image data and a start input step of receiving start input for outputting image from a user, wherein the image scanning step is characterized by including a first scan step of scanning the image data before the start input for outputting image is received in the start input step, and the image output step is characterized by outputting the image data after the start input for outputting image is received in the start input step.

Further, Japanese Patent Laid-Open No. H8-152813 describes an image forming apparatus that has a document table holding a document to be copied, a document table cover for covering the document table, a scanning means that is provided below the document table and scans image information of the document, a document detection means that is provided below the document table and detects that the document is placed on the document table, an image forming means that forms image information that has been scanned by the scanning means on a paper, and a control means that controls image formation to be performed by the image forming means when the document detection means confirms presence of the document.

However, in the image output method described in Japanese Patent Laid-Open No. 2006-203874, the user is required to input an operation of the start input for outputting image. Further, the user must input an operation of selecting a paper on which an image is to be formed from among a plurality of types of papers. In the case where a paper of a default type is used from among the plurality of types of papers, the user is not required to perform an operation of selecting a paper. However, the user cannot designate a type of paper on which an image is to be formed from among the plurality of types of papers. Further, in the image forming apparatus described in Japanese Patent Laid-Open No. H8-152813, although the user is not required to provide start input for outputting image, the user cannot designate a type of paper on which an image is to be formed from among a plurality of types of papers.

SUMMARY

According to one aspect of the present invention, an image forming apparatus includes a document tray in which a document is to be set, a medium container that contains a recording medium, a document detection sensor that detects a document set in the document tray, a medium detection sensor that detects a recording medium contained in the medium container, and a hardware processor, wherein the hardware processor executes a copy operation of forming an image of image data obtained by scanning of a document set in the document tray on a recording medium contained in the medium container, determines to automatically execute the copy operation in the case where an elapsed period of time between a document detection time when a document is detected by the document detection sensor and a medium detection time when a recording medium is detected by the medium detection sensor is equal to or smaller than a predetermined operation period of time, and automatically executes the copy operation based on determination of automatic execution of the copy operation.

According to another aspect of the present invention, an automatic copy method is to be executed in an image forming apparatus, the image forming apparatus includes a document tray in which a document is to be set, a medium container that is to contain a recording medium, and a hardware processor that executes a copy operation of forming an image of image data obtained by scanning of a document that is set in the document tray on a recording medium contained in the medium container, and the automatic copy method includes a document detection step of detecting a document set in the document tray, a medium detection step of detecting a recording medium contained in the medium container, and a copy determination step of determining automatic execution of the copy operation in the case where an elapsed period of time between a document detection time when a document is detected in the document detection step and a medium detection time when a recording medium is detected in the medium detection step is equal to or smaller than a predetermined operation period of time, wherein a copy control step includes automatic execution of a copy operation based on determination in the copy determination step.

According to yet another aspect of the present invention, a non-transitory computer readable recording medium is encoded with an automatic copy program to be executed in a computer controlling an image forming apparatus, the image forming apparatus includes document tray in which a document is to be set, and a medium container that is to contain a recording medium, and the automatic copy program causing the computer to execute a copy control step of executing a copy operation of forming an image of image data obtained by scanning of a document that is set in the document tray on a recording medium contained in the medium container, a document detection step of detecting a document set in the document tray, a medium detection step of detecting a recording medium contained in the medium container, and a copy determination step of determining automatic execution of the copy operation in the case where an elapsed period of time between a document detection time when a document is detected in the document detection step and a medium detection time when a recording medium is detected in the medium detection step is equal to or smaller than a predetermined operation period of time, wherein a copy control step includes automatic executing a copy operation based on determination in the copy determination step.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
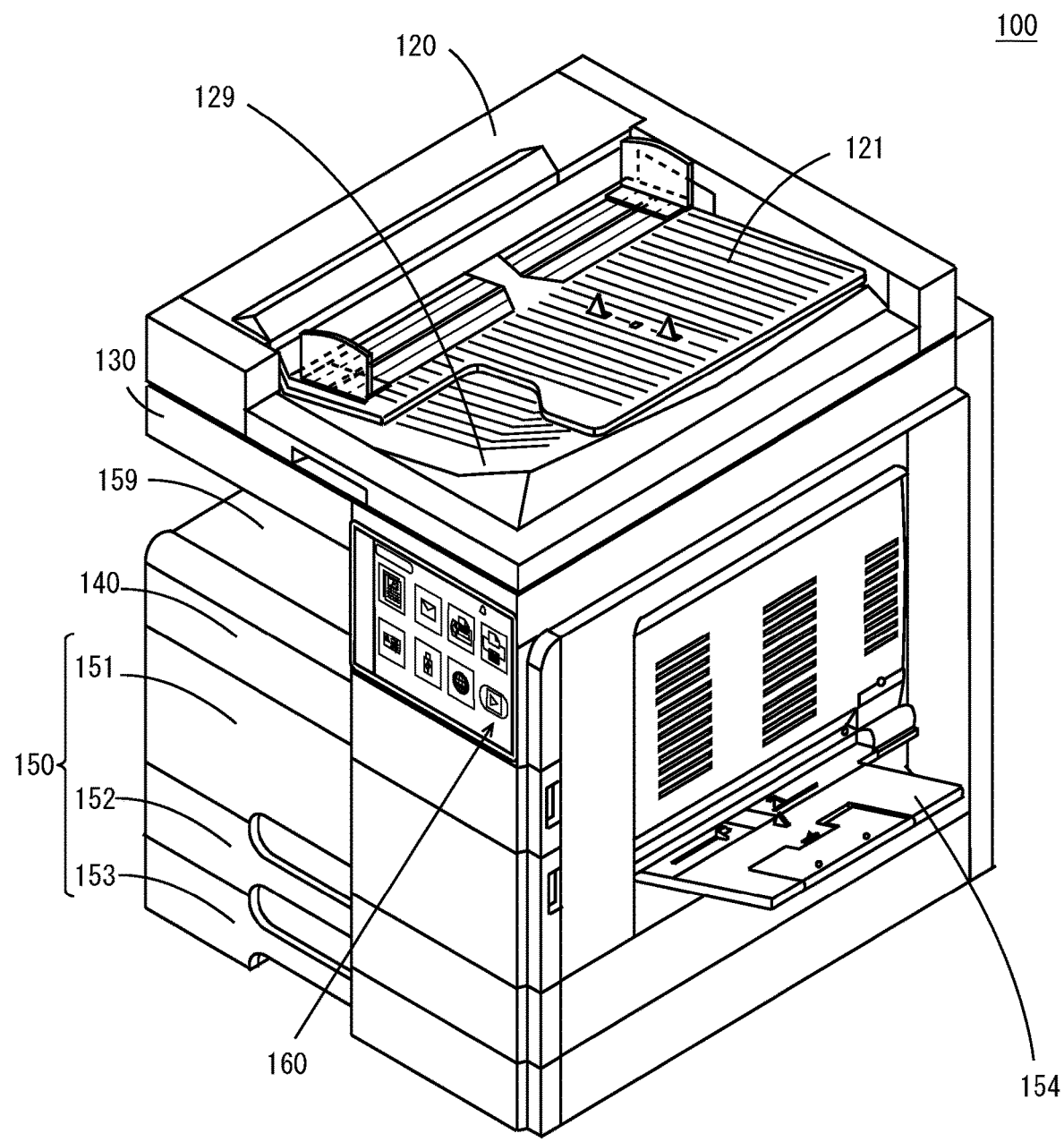
FIG. 1 is a perspective view showing the appearance of an MFP in the present embodiment.

Hereinafter, one or more embodiments of the present invention will be described with reference to the drawings. However, the scope of the invention is not limited to the disclosed embodiments.

An image forming apparatus in embodiments of the present invention will be described below with reference to the drawings. In the following description, the same parts are denoted with the same reference characters. Their names and functions are also the same. Thus, a detailed description thereof will not be repeated. Further, in the following description, an MFP is explained as one example of the image forming apparatus. Further, in the MFP described below, a recording medium on which an image is to be formed includes a paper (a sheet of paper) such as a plain paper, a wood free paper, a recycled paper or a photo paper or an OHP (Overhead Projector) film In the following description, a paper is used as a recording medium.

Figure 2:
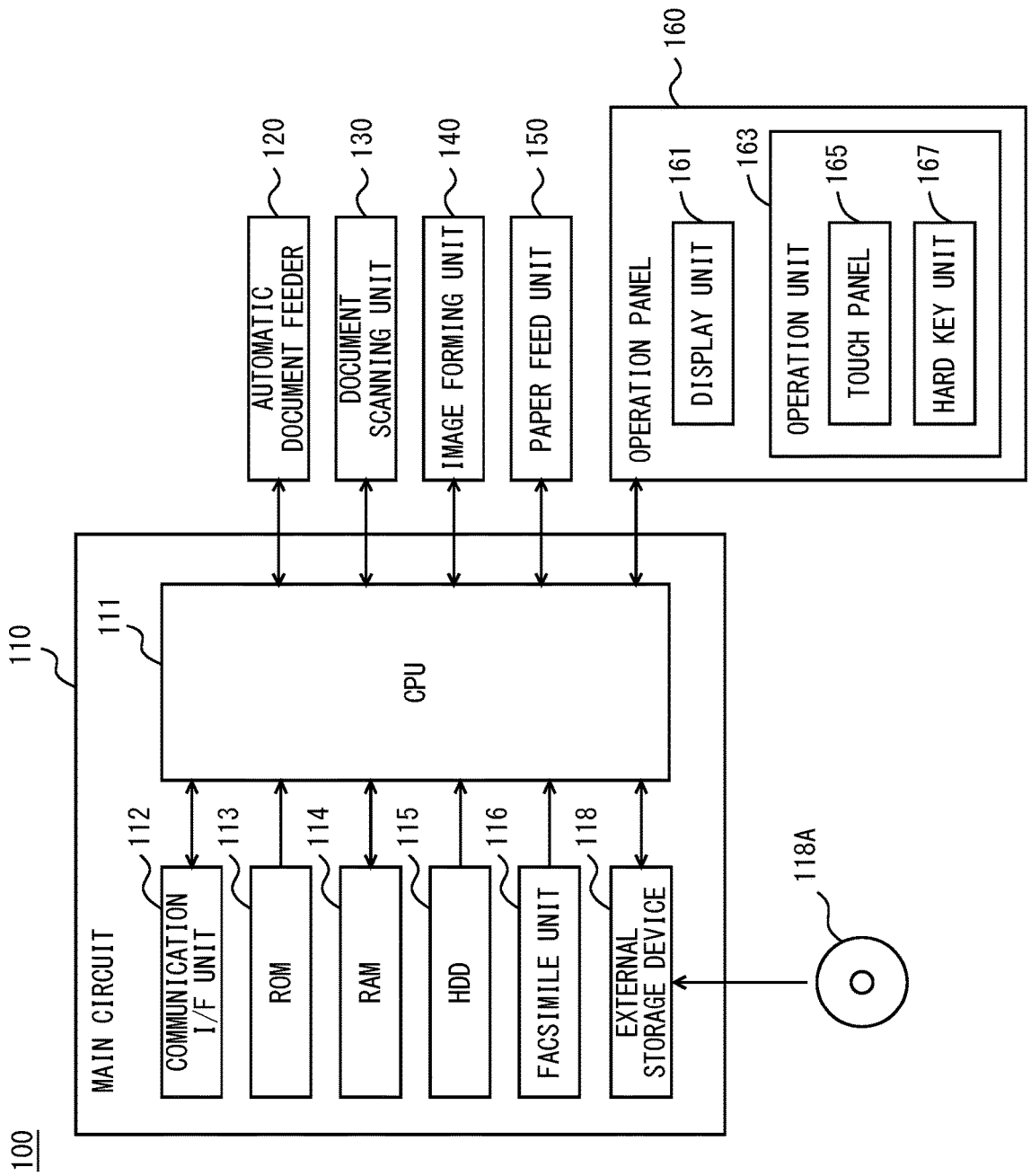
FIG. 2 is a block diagram showing the overview of the hardware configuration of the MFP.

FIG. 1 is a perspective view showing the appearance of the MFP in the present embodiment. FIG. 2 is a block diagram showing the overview of the hardware configuration of the MFP. With reference to FIGS. 1 and 2, the MFP 100 is one example of the image forming apparatus and includes a main circuit 110, a document scanning unit 130 for scanning a document, an automatic document feeder 120 for conveying a document to the document scanning unit 130, an image forming unit 140 for forming an image on a recording medium based on image data, a paper feed unit 150 for supplying a recording medium to the image forming unit 140 and an operation panel 160 serving as a user interface.

The automatic document feeder 120 automatically conveys a plurality of documents set on a document tray 121 to a document scanning position of the document scanning unit 130 one by one, and discharges a document having an image formed thereon and scanned by the document scanning unit 130 onto a document discharge tray 129.

The document scanning unit 130 has a rectangular scanning surface for scanning a document. The scanning surface is formed of a platen glass, for example. The automatic document feeder 120 is connected to the main body of the MFP 100 to be rotatable about an axis parallel to one side of the scanning surface and is openable and closable. The document scanning unit 130 is arranged below the automatic document feeder 120, and the scanning surface of the document scanning unit 130 is exposed with the automatic document feeder 120 rotated and open. Thus, a user can place a document on the scanning surface of the document scanning unit 130. The automatic document feeder 120 can change between an open state in which the scanning surface of the document scanning unit 130 is exposed and a close state in which the scanning surface is covered. The automatic document feeder 120 includes a state detection sensor for detecting the open state of the automatic document feeder 120.

The document scanning unit 130 includes a light source that emits light and an optoelectronic transducer that receives light, and scans an image formed on a document placed on the scanning surface. In the case where a document is placed on a scan region, the light emitted from the light source is reflected from the document, and the reflected light forms an image on the optoelectronic transducer. When receiving the light reflected from the document, the optoelectronic transducer produces image data by converting the received light into an electrical signal. The document scanning unit 130 outputs the image data to a CPU (Central Processing Unit) 111 included in the main circuit 110.

The paper feed unit 150 includes a plurality of medium containers for containing recording media. The paper feed unit 150 takes out a recording medium contained in any of the plurality of medium containers and conveys the recording medium to the image forming unit 140. The plurality of medium containers include three paper feed trays 151, 152, 153 and a manual paper feed tray 154. In the following description, a paper is used as a recording medium, by way of example Papers include a plurality of types the sizes of which are different from one another. Further, a paper has different lengths in a longer direction and a shorter direction. Here, a direction parallel to the longer direction of the paper is referred to as a longitudinal direction, and a direction parallel to the shorter direction of the paper is referred to as a transverse direction.

The paper feed trays 151, 152, 153 are respectively fixed containers, and the size and the orientation of a paper to be contained in each fixed container are defined. The manual paper feed tray 154 is an undecided container, and the size and the orientation of a paper to be contained in the manual paper feed tray 154 are not defined. The manual paper feed tray normally does not contain a paper. A paper is often put by a user in the case where the user causes the MFP 100 to execute an image forming process.

The image forming unit 140 is controlled by the CPU 111 and forms an image on a recording medium that is conveyed by the paper feed unit 150 using a well-known electrophotographic method. In the present embodiment, the image forming unit 140 forms an image of image data input from the CPU 111 on a recording medium conveyed by the paper feed unit 150. A recording medium on which an image is formed is discharged to the paper discharge tray 159. The image data that is output by the CPU 111 to the image forming unit 140 includes image data such as externally received print data in addition to image data input from the document scanning unit 130.

The main circuit 110 includes a CPU 111 for controlling the MFP 100 as a whole, a communication interface (I/F) unit 112, a ROM (Read Only Memory) 113, a RAM (Random Access Memory) 114, a Hard Disc Drive (HDD) 115 that is used as a mass storage device, a facsimile unit 116 and an external storage device 118. The CPU 111 is connected to the automatic document feeder 120, the document scanning unit 130, the image forming unit 140, the paper feed unit 150 and the operation panel 160, and controls the MFP 100 as a whole.

The ROM 113 stores a program to be executed by the CPU 111 or data required for execution of the program. The RAM 114 is used as a work area when the CPU 111 executes a program. Further, the RAM 114 temporarily stores image data successively transmitted from the document scanning unit 130.

The operation panel 160 is provided in an upper part of the MFP 100. The operation panel 160 includes a display unit 161 and an operation unit 163. The display unit 161 is a Liquid Crystal Display (LCD), for example, and displays an instruction menu for the user, information about acquired image data, etc. As long as displaying images, an organic EL (Electroluminescence) display, for example, can be used instead of an LCD.

The operation unit 163 includes a touch panel 165 and a hard key unit 167. The touch panel 165 is a capacitance type. The touch panel 165 is not limited to the capacitance type, and another type such as a resistive film type, a surface acoustic wave type, an infrared type and an electromagnetic induction type can be used.

The touch panel 165 is provided with its detection surface being overlaid on an upper surface or a lower surface of the display unit 161. Here, the size of the detection surface of the touch panel 165 and the size of the display surface of the display unit 161 are the same. Therefore, the coordinate system of the display surface and the coordinate system of the detection surface are the same. The touch panel 165 detects the position designated by the user on the display surface of the display unit 161 using the detection surface, and outputs a set of coordinates of the detected position to the CPU 111. Because the coordinate system of the display surface and the coordinate system of the detection surface are the same, the set of coordinates output by the touch panel 165 can be replaced with the set of coordinates of the display surface.

The hard key unit 167 includes a plurality of hard keys. The hard keys are contact switches, for example. The touch panel 165 detects a position designated by the user on the display surface of the display unit 161. In the case where operating the MFP 100, the user is likely to be in an upright attitude. Therefore, the display surface of the display unit 161, an operation surface of the touch panel 165 and the hard key unit 167 are arranged to face upward. This is for the purpose of enabling the user to easily view the display surface of the display unit 161 and easily provide an instruction on the operation unit 163 with his or her finger.

The communication I/F unit 112 is an interface for connecting the MFP 100 to a network. The communication I/F unit 112 communicates with another computer or a data processing apparatus connected to the network using a communication protocol such as TCP (Transmission Control Protocol) or UDP (File Datagram Protocol). The network to which the communication I/F unit 112 is connected is a Local Area Network (LAN), either wired or wireless. Further, the network is not limited to a LAN and may be a Wide Area Network (WAN), a Public Switched Telephone Network (PSTN), the Internet or the like.

The facsimile unit 116 is connected to the Public Switched Telephone Network (PSTN), transmits facsimile data to the PSTN or receives facsimile data from the PSTN. The facsimile unit 116 stores the received facsimile data in the HDD 115, converts the facsimile data into print data that is printable in the image forming unit 140 and outputs the data to the image forming unit 140. Thus, the image forming unit 140 forms an image represented by the facsimile data received from the facsimile unit 116 on a paper. Further, the facsimile unit 116 converts the data stored in the HDD 115 into facsimile data and transmits the converted facsimile data to a facsimile machine connected to the PSTN.

The external storage device 118 is controlled by the CPU 111 and mounted with a CD-ROM (Compact Disk Read Only Memory) 118A or a semiconductor memory. While the CPU 111 executes a program stored in the ROM 113 by way of example in the present embodiment, the CPU 111 may control the external storage device 118, read a program to be executed by the CPU 111 from the CD-ROM 118A and store the read program in the RAM 114 for execution.

It is noted that a recording medium for storing the program executed by the CPU 111 is not limited to the CD-ROM 118A. It may be a flexible disc, a cassette tape, an optical disc (MO (Magnetic Optical Disc)/MD (Mini Disc)/DVD (Digital Versatile Disc)), an IC card, an optical card, and a semiconductor memory such as a mask ROM and an EPROM (Erasable Programmable ROM). Further, the CPU 111 may download a program from a computer connected to the network and store the program in the HDD 115, or the computer connected to the network may write the program in the HDD 115. Then, the program stored in the HDD 115 may be loaded into the RAM 114 to be executed by the CPU 111. The program referred to here includes not only a program directly executable by the CPU 111 but also a source program, a compressed program, an encrypted program and the like.

Figure 3:
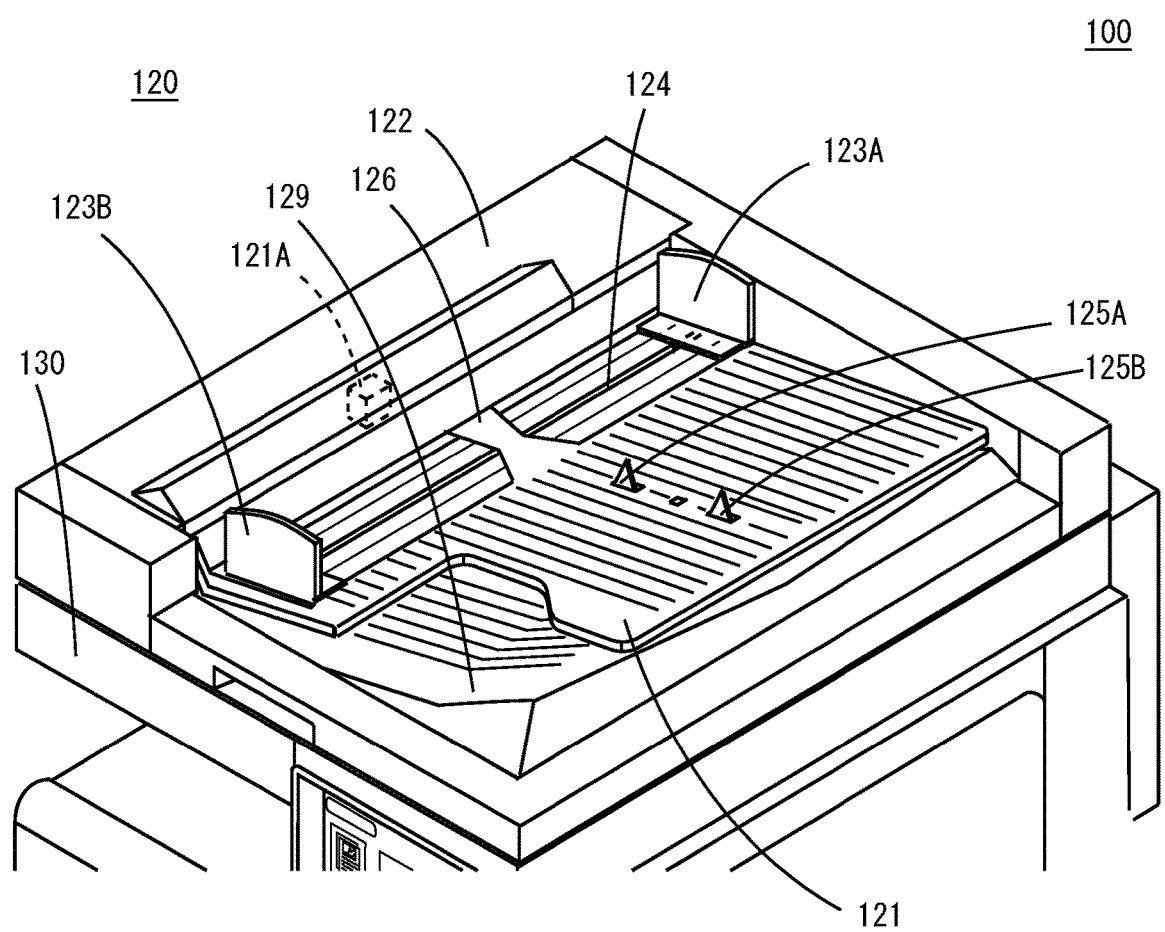
FIG. 3 is a perspective view of a document tray.

FIG. 3 is a perspective view showing the document tray. FIG. 3 shows a portion in which the document tray 121 is installed in the MFP 100. With reference to FIG. 3, the document tray 121 includes a pair or document width adjustment plates 123A, 123B, a groove 124 and document detection projections 125A, 125B. The document tray 121 has an end portion 126 coupled to a main body 122 of the automatic document feeder 120. The document tray 121 has an inclined upper surface that is attached to the main body 122 of the automatic document feeder 120. The end portion 126 is at the lowest position and the end portion opposite to the end portion 126 is at the highest position. The pair of document width adjustment plates 123A, 123B is mounted on the document tray 121 to be slidable along a groove 124. The pair of document width adjustment plates 123A, 123B respectively has surfaces that are opposite to each other and vertical to the groove 124.

In the case where a document is placed on the upper surface of the document tray 121, the document slides down along the inclination of the upper surface of the document tray 121 toward the end portion 126 and abuts against the main body 122 of the automatic document feeder 120, whereby the ends of the document are aligned with each other. Thus, the relative position of the document relative to the document tray 121 in a direction vertical to the groove 124 is defined. In the main body 122 of the automatic document feeder 120, a document detection sensor 121A for detecting a document that is present in the end portion 126 of the upper surface of the document tray 121 is provided.

The pair of document width adjustment plates 123A, 123B are coupled to each other by the rack and pinion mechanism. Thus, in regard to the pair of document width adjustment plates 123A, 123B, in the case where one of them slides toward the other one, the other one moves toward the one. Further, in the case where one slides away from the other one, the other one moves away from the one. The user moves one of the pair of document width adjustment plates 123A, 123B such that the distance between the pair of document width adjustment plates 123A, 123B is larger than the length of a document (the width of the document) that is parallel to the groove 124. Then, the user places the document on the document tray 121 and then moves one of the pair of document width adjustment plates 123A, 123B until each of the pair of document width adjustment plates 123A, 123B abuts against the document. Thus, because the center, in a direction parallel to the groove 124, of the document is defined to be at the center of the pair of document width adjustment plates 123A, 123B, the position of the document relative to the document tray 123 is defined. In the rack and pinion mechanism, a document width sensor for measuring the distance between the pair of document width adjustment plates 123A, 123B is mounted.

The document detection projection 125A is arranged in the document tray 121 at a position closer to the end portion 126 than the document detection projection 125B. Therefore, the distance between the end portion 126 and the document detection projection 125A is shorter than the distance between the end portion 126 and the document detection projection 125B. The document detection projections 125A, 125B are respectively attached to the document tray 121 to be movable in an up-and-down direction. The document detection projections 125A, 125B are respectively biased upwardly by springs with respect to the document tray 121. Therefore, with a document not set in the document tray 121, the document detection projections 125A, 125B respectively project farther upwardly than the upper surface of the document tray 121. The document detection projections 125A, 125B are respectively and downwardly pressed by the weight of a document set in the document tray 121. Sensors for detecting a downward pressure are provided with respect to the respective document detection projections 125A, 125B. Here, sensors respectively provided with respect to the document detection projections 125A, 125B output OFF signals in the case where the document detection projections 125A, 125B respectively project from the upper surface of the document tray 121, and output ON signals in the case where the document detection projections 125A, 125B are respectively pressed downwardly.

The distance between the end portion 126 and the document detection projection 125A is adjusted to be longer than the length of a paper of B5 size in the shorter direction and shorter than the length of a paper of A4 size in the shorter direction. Further, the distance between the end portion 126 and the document detection projection 125B is adjusted to be longer than the length of a paper of A4 size in the shorter direction and shorter than the length of a paper of B5 size in the longer direction.

The signals output by the sensors respectively corresponding to the document detection projections 125A, 125B differ depending on the size of a document set in the document tray 121. Combinations of output signals of the sensors respectively corresponding to the document detection projections 125A, 125B include a first set in which the sensor corresponding to the document detection projection 125A outputs an OFF signal and the sensor corresponding to the document detection projection 125B outputs an OFF signal, a second set in which the sensor corresponding to the document detection projection 125A outputs an ON signal and the sensor corresponding to the document detection projection 125B outputs an OFF signal, and a third set in which the sensor corresponding to the document detection projection 125A outputs an ON signal and the sensor corresponding to the document detection projection 125B outputs an ON signal.

Therefore, in the case where the document detection sensor 121A detects a document being set in the document tray 121, the size of the document is defined based on a width of the document detected by the document width sensor and a combination of signals output by the sensors respectively corresponding to the document detection projections 125A, 125B. Whether the document set in the document tray 121 indicates an A size including an A4 size and an A3 size, or a B size including a B5 size and a B4 size is determined based on the width of the document detected by the document width sensor. In the case where the width of a document indicates the B size and the output signals of the sensors respectively corresponding to the document detection projections 125A, 125B belong to the first set, the size of the document is the B5. In the case where the width of a document indicates the B size and the output signals of the sensors respectively corresponding to the document detection projections 125A, 125B belong to the third set, the size of the document is the B4. In the case where the width of a document indicates the A size and the output signals of the sensors respectively corresponding to the document detection projections 125A, 125B belong to the second set, the size of the document is the A4. In the case where the width of a document indicates the A size and the output signals of the sensors respectively corresponding to the document detection projections 125A, 125B belong to the third set, the size of the document is the A3.

Figure 4:
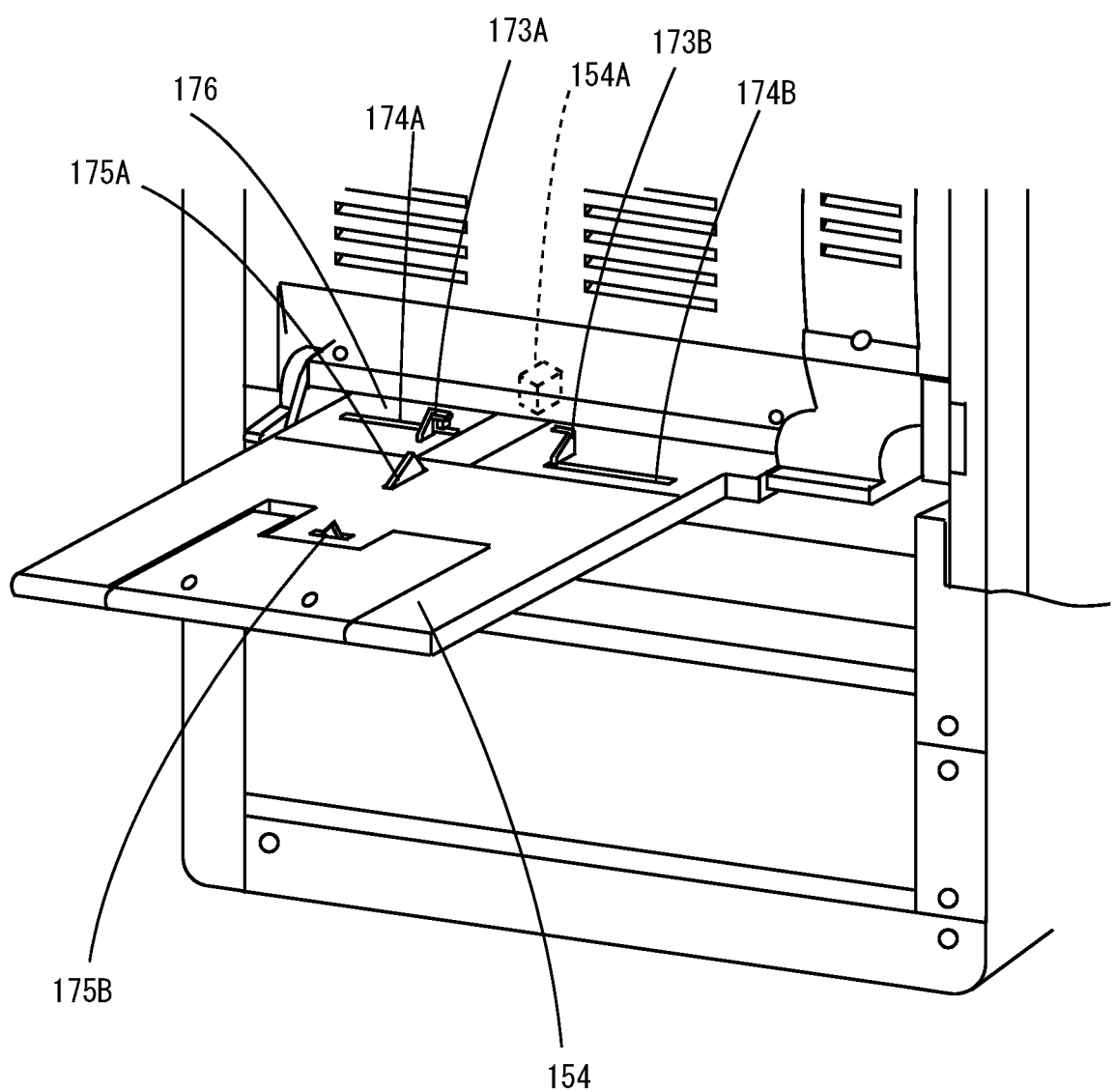
FIG. 4 is a perspective view of a manual paper feed tray.

FIG. 4 is a perspective view of the manual paper feed tray. FIG. 4 shows a portion where the manual paper feed tray 154 is installed in the MFP 100. With reference to FIG. 4, the manual paper feed tray 154 includes a pair of paper width adjustment plates 173A, 173B, grooves 174A, 174B and paper detection projections 175A, 175B. The manual paper feed tray 154 has an end portion 176 coupled to the main body of the MFP 100. The manual paper feed tray 154 has an inclined upper surface that is attached to the main body of the MFP 100. The end portion 176 is located at the lowest position, and an end portion opposite to the end portion 176 is located at the highest position. The pair of paper width adjustment plates 173A, 173B is mounted on the manual paper feed tray 154 to be respectively slidable along the grooves 174A, 174B. The groove 174A and the groove 174B are parallel to each other. The pair of paper width adjustment plates 173A, 173B respectively has surfaces that are opposite to each other and vertical to the grooves 174A, 174B.

In the case where a paper is placed on the upper surface of the manual paper feed tray 154, the paper slides down along the inclination of the upper surface of the manual paper feed tray 154 toward the end portion 176 and abuts against the main body of the MFP 100, whereby the ends of the paper are aligned with each other. Thus, the relative position of the paper relative to the manual paper feed tray 154 in the direction vertical to the grooves 174A, 174B is defined. A paper detection sensor 154A for detecting a paper present in the end portion 176 of the upper surface of the manual paper feed tray 154 is provided in the main body of the MFP 100.

The pair of paper width adjustment plates 173A, 173B are coupled to each other by the rack and pinion mechanism. Therefore, in regard to the pair of paper width adjustment plates 173A, 173B, in the case where one slides towards the other one, the other one moves toward the one. In the case where the one slides away from the other one, the other one moves away from the one. The user moves one of the pair of paper width adjustment plates 173A, 173B such that the distance between the pair of paper width adjustment plates 173A, 173B is larger than the length (the width of a paper) of a paper in the direction parallel to the grooves 174A, 174B, and then places the paper in the manual paper feed tray 154. Thereafter, the user moves one of the pair of paper width adjustment plates 173A, 173B until the pair of paper width adjustment plates 173A, 173B respectively abut against the paper. Thus, because the center, in the direction parallel to the grooves 174A, 174B, of the paper is defined to be at the center of the pair of paper width adjustment plates 173A, 173B, the relative position of the paper relative to the manual paper feed tray 154 is defined. In the rack and pinion mechanism, a paper width sensor for measuring the distance between the pair of paper width adjustment plates 173A, 173B is mounted.

The paper detection projection 175A is arranged in the manual paper feed tray 154 at a position closer to the end portion 176 than the paper detection projection 175B. Therefore, the distance between the end portion 176 and the paper detection projection 175A is shorter than the distance between the end portion 176 and the paper detection projection 175A. The paper detection projections 175A, 175B are respectively attached to the manual paper feed tray 154 to be movable in the up-and-down direction. The paper detection projections 175A, 175B are respectively biased upwardly by springs with respect to the manual paper feed tray 154. Therefore, with a paper not set in the manual paper feed tray 154, the paper detection projections 175A, 175B respectively project farther upwardly than the upper surface of the manual paper feed tray 154. The paper detection projections 175A, 175B are respectively and downwardly pressed by weight of a paper set in the manual paper feed tray 154. Sensors for detecting a downward pressure are respectively provided with respect to the paper detection projections 175A, 175B. Here, the sensors respectively provided in the paper detection projections 175A, 175B output OFF signals in the case where the paper detection projections 175A, 175B respectively project from the upper surface of the manual paper feed tray 154, and output ON signals in the case where the paper detection projections 175A, 175B are respectively pressed downwardly.

The distance between the end portion 176 and the paper detection projection 175A is adjusted to be longer than the length of a paper of B5 size in the shorter direction and shorter than the length of a paper of A4 size in the shorter direction. Further, the distance between the end portion 176 and the paper detection projection 175B is adjusted to be longer than the length of a paper of A4 size in the shorter direction and shorter than the length of a paper of B5 size in the longer direction.

The output signals of the sensors respectively corresponding to the paper detection projections 175A, 175B differ depending on the size of a paper set in the manual paper feed tray 154. Combinations of output signals of the sensors respectively corresponding to the paper detection projections 175A, 175B include a first set in which the sensor corresponding to the paper detection projection 175A outputs an OFF signal and the sensor corresponding to the paper detection projection 175B outputs an OFF signal, a second set in which the sensor corresponding to the paper detection projection 175A outputs an ON signal and the sensor corresponding to the paper detection projection 175B outputs an OFF signal, and a third set in which the sensor corresponding to the paper detection projection 175A outputs an ON signal and the sensor corresponding to the paper detection projection 175B outputs an ON signal.

Therefore, in the case where the paper detection sensor 154A detects a paper being set in the manual paper feed tray 154, the size of the paper is defined based on the width of the paper detected by the paper width sensor and a combination of output signals of the sensors respectively corresponding to the paper detection projections 175A, 175B. Whether the paper set in the manual paper feed tray 154 is the A size including the A4 size and the A3 size, or the B size including the B5 size and the B4 size is determined based on the width of the paper detected by the document width sensor. In the case where the width of a paper is the B size and the output signals of the sensors respectively corresponding to the paper detection projections 175A, 175B belong to the first set, the size of the paper is the B5. In the case where the width of a paper is the B size and the output signals of the sensors respectively corresponding to the paper detection projections 175A, 175B belong to the third set, the size of the document is the B4. In the case where the width of a paper is the A size and the output signals of the sensors respectively corresponding to the paper detection projections 175A, 175B belong to the second set, the size of the paper is the A4. In the case where the width of a paper is the A size and the output signals of the sensors respectively corresponding to the paper detection projections 175A, 175B belong to the third set, the size of the document is the A3.

Figure 5:
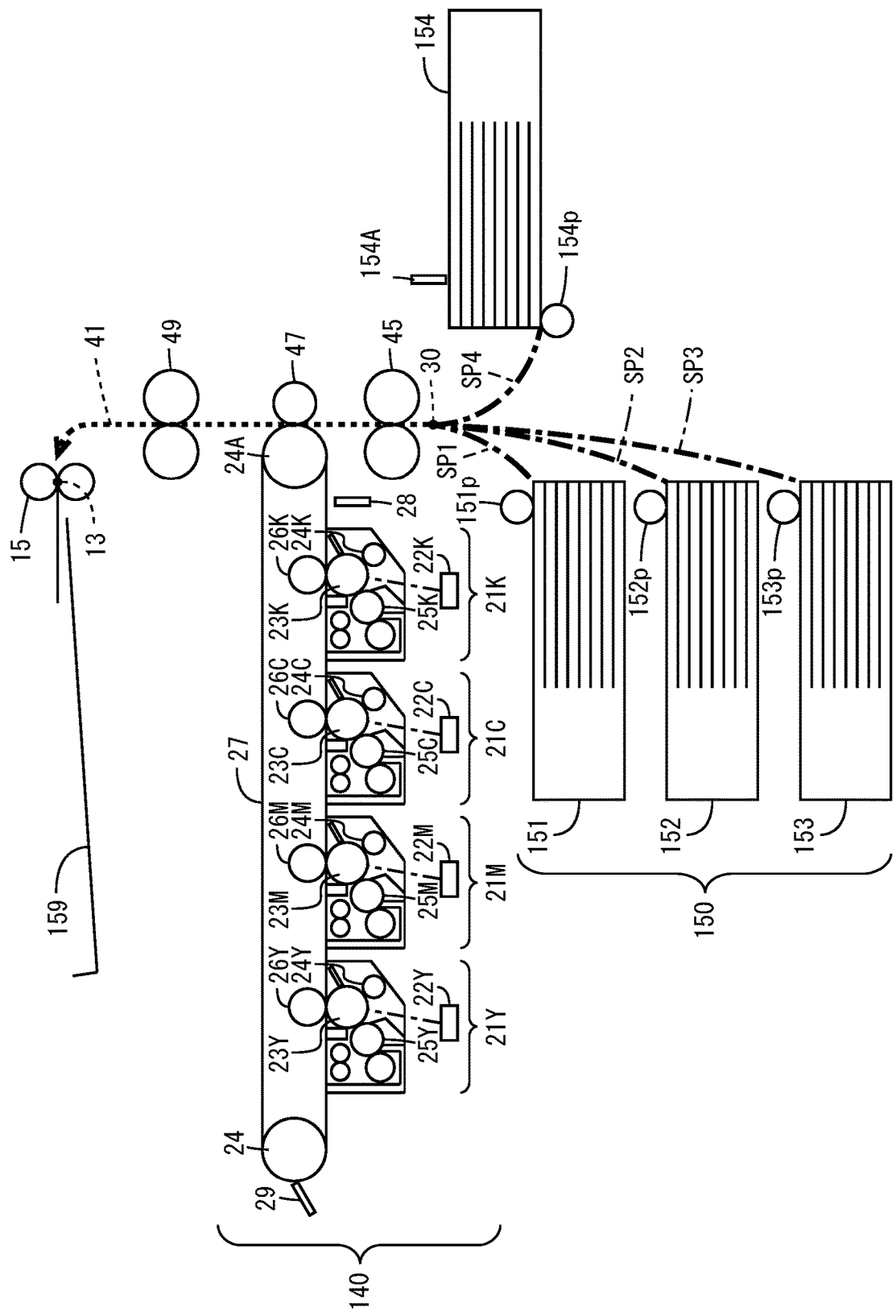
FIG. 5 is a schematic side view showing the inner configuration of part of an image forming unit and a paper feed unit.

FIG. 5 is a schematic side view showing the inner configuration of part of the image forming unit and the paper feed unit. With reference to FIG. 5, a main conveyance path 41 indicated by the thick dotted arrow is formed to basically extend in the up-and-down direction in the MFP 100. The main conveyance path 41 is the path for guiding a paper that is conveyed from the paper feed unit 150 to the paper discharge tray 159 through the image forming unit 140. In the main conveyance path 41 of the present example, a lower end 30 opposite to an upper end 13 located at a position farther upward than the image forming unit 140 constitutes an inlet port for receiving papers from the paper feed unit 150. Further, the upper end 13 of the main conveyance path 41 constitutes a discharge port for discharging papers on which images have been formed to the paper discharge tray 159. A paper discharge roller 15 is provided at the upper end 13 of the main conveyance path 41.

The paper feed unit 150 includes the three paper feed trays 151, 152, 153 and the manual paper feed tray 154. The three paper feed trays 151, 152, 153 are arranged in a stack in this order from above toward below. The manual paper feed tray 154 is provided at a sidewall of the MFP 100 and located at a position farther downward than the image forming unit 140. As indicated by the thick one-dot and dash lines in FIG. 5, the paper feed trays 151, 152, 153 and the manual paper feed tray 154 are connected to the lower end 30 of the main conveyance path 41 through respective sub-conveyance paths SP1, SP2, SP3, SP4.

Pickup rollers 151p, 152p, 153p, 154p are respectively provided to correspond to the paper feed trays 151, 152, 153 and the manual paper feed tray 154. Taking out a recording medium from each of the paper feed trays 151, 152, 153 and the manual paper feed tray 154 and conveying the recording medium are common behavior among the paper feed trays 151, 152, 153 and the manual paper feed tray 154. Here, a recording medium is taken from the paper feed tray 151, by way of example In the paper feed tray 151, one or more recording media are contained in a stack. The paper feed tray 151 has a lift-up mechanism that lifts the one or more contained recording media. The pickup roller 151p is biased by an elastic member such as a spring to abut against a recording medium at the top among the one or more recording media contained in the paper feed tray 151 from above. The pickup roller 151p presses the recording medium from above. The pickup roller 151p rotates, so that the recording medium at the top is sent out to the sub-conveyance path SP1 by a friction force between the pickup roller 151p and the recording medium. The recording medium sent out to the sub-conveyance path SP1 is supplied to the main conveyance path 41.

In the MFP 100, during image formation, a tray containing a recording medium on which an image is to be formed is selected from among the three paper feed trays 151, 52, 153 and the manual paper feed tray 154 as a subject tray. A pickup roller and a paper feed roller corresponding to a tray selected as a subject tray from among the three paper feed trays 151, 152, 153 and the manual paper feed tray 154 operate, whereby a recording medium is supplied to the main conveyance path 41 through any of the sub-conveyance paths SP1, SP2, SP3, SP4 from the tray selected as the subject tray.

The image forming unit 140 has an intermediary transfer system and includes respective image forming units 21Y, 21M, 21C, 21K for respective yellow, magenta, cyan and black. At least one of the image forming units 21Y, 21M, 21C, 21K is driven, so that an image is formed on a recording medium. When all of the image forming units 21Y, 21M, 21C, 21K are driven, a full color image is formed. Printing data pieces for yellow, magenta, cyan and black are respectively input to the image forming units 21Y, 21M, 21C, 21K. The only difference among the image forming units 21Y, 21M, 21C, 21K is the color of toner used by the image forming units 21Y, 21M, 21C, 21K. Here, the image forming unit 21Y for forming an image in yellow will be described.

The image forming unit 21Y includes an exposure head 22Y to which printing data for yellow is input, a photoreceptor drum 23Y which is one example of an image carrier, an electric roller 24Y, a development roller 25Y and a first transfer roller 26Y. The exposure head 22Y emits laser light in accordance with the received printing data (an electrical signal). The emitted laser light is reflected by a polygon mirror included in the exposure head 22Y and one-dimensionally scans the photoreceptor drum 23Y to expose the photoreceptor drum 23Y. The direction in which the laser light one-dimensionally scans the photoreceptor drum 23Y is a main scanning direction. The electric roller 24Y is an elastic body and arranged to be pressed against the photoreceptor drum 23Y. After being electrically charged by the electric roller 24Y, the photoreceptor drum 23Y is irradiated with the laser light emitted by the exposure head 22Y. Thus, an electrostatic latent image is formed on the photoreceptor drum 23Y. Subsequently, toner is applied onto the electrostatic latent image by the development roller 25Y, and a toner image is formed. A toner image formed on the photoreceptor drum 23Y is transferred onto an intermediate transfer belt 27 (an image carrier) by the first transfer roller 26Y.

The image forming unit 21Y includes an exposure head 22M to which printing data for magenta is input, a photoreceptor drum 23M, a electric roller 24M, a development roller 25M and a first transfer roller 26M. The image forming unit 21Y includes an exposure head 22C to which printing data for cyan is input, a photoreceptor drum 23C, an electric roller 24C, a development roller 25C and a first transfer roller 26C. The image forming unit 21Y includes an exposure head 22K to which printing data for black is input, a photoreceptor drum 23K, an electric roller 24K, a development roller 25K and a first transfer roller 26K.

On the other hand, the intermediate transfer belt 27 is one example of an image carrier and is suspended by a driving roller 24 and a roller 24A not to loosen. When the driving roller 24 rotates in an anti-clockwise direction in the diagram, the intermediate transfer belt 27 rotates in the anti-clockwise direction in the diagram at a predetermined speed. The roller 24A rotates in the anti-clockwise direction due to the rotation of the intermediate transfer belt 27.

Thus, the image forming units 21Y, 21M, 21C, 21K sequentially transfer toner images onto an image carrier surface of the intermediate transfer belt 27. The intermediate transfer belt 27 carries a toner image that has been transferred onto the image carrier surface. Timing for transferring toner images onto the intermediate transfer belt 27 by the respective image forming units 21Y, 21M, 21C, 21K is adjusted by detection of a reference mark provided on the intermediate transfer belt 27. Thus, toner images in yellow, magenta, cyan and black are superimposed on the intermediate transfer belt 27.

Further, the image forming unit 140 includes an IDC (Image Density Control) sensor 28. The IDC sensor 28 is a light intensity sensor including a reflective photo sensor, for example, and detects a toner image formed on the intermediate transfer belt 27 by detecting an intensity of light reflected from the surface of the intermediate transfer belt 27. A result of detection by the IDC sensor 28 is used for an image stabilization process. The image stabilization process is a process of determining a control value used for control of the image forming unit 140. Specifically, the image stabilization process is a process of causing the image forming unit 140 to form a predetermined patch image on the intermediate transfer belt 27 and determining control values based on a result of measurement of density of the patch image. The control values include a voltage applied to the electric rollers 24Y, 24M, 24C, 24K, a bias voltage applied to the development rollers 25Y, 25M, 25C, 25K, a first transfer voltage applied to the first transfer rollers 26Y, 26M, 26C, 26K and a second transfer voltage applied to a second transfer roller 47.

Further, the image forming unit 140 includes a cleaning blade 29. The cleaning blade 29 is formed of an elastic body such as urethane rubber and is arranged to be capable of rubbing against the intermediate transfer belt 27. The cleaning blade 29 cleans the intermediate transfer belt 27 by scraping a toner image remaining on the intermediate transfer belt 27 as the intermediate transfer belt 27 rotates.

In the above-mentioned main conveyance path 41, a timing roller 45, the second transfer roller 47 and a fuser roller 49 are arranged in this order at intervals from the lower end 30 to the upper end 13. The second transfer roller 47 is formed of an elastic body such as foam rubber and is pressed against the roller 24A with the intermediate transfer belt 27 held therebetween. In the present example, the MFP 100 does not have a pressure-separation mechanism for switching the state, between the intermediate transfer belt 27 and the second transfer roller 47, between a pressure state and a separation state. Thus, the cost of the MFP 100 can be reduced, and the size of the MFP 100 can be reduced. A recording medium that has been supplied from the paper feed unit 150 to the main conveyance path 41 is sent to the timing roller 45.

The timing roller 45 adjusts the conveyance state of a recording medium in the main conveyance path 41 such that the recording medium arrives at a position between the roller 24A and the second transfer roller 47 at a point in time at which a toner image formed on the intermediate transfer belt 27 arrives at a position between the roller 24A and the second transfer roller 47. A recording medium conveyed by the timing roller 45 is pressed against the intermediate transfer belt 27 by the second transfer roller 47, and the second transfer roller 47 is electrically charged. Thus, toner images in yellow, magenta, cyan and black that are formed on the intermediate transfer belt 27 in a superimposed manner are transferred to the recording medium. The voltage applied to the second transfer roller 47 is controlled by the CPU 111 such that an electric charge amount of the second transfer roller 47 is a value suitable for the basis weight of a recording medium.

The recording medium to which the toner image has been transferred is conveyed to the fuser roller 49 and heated by the fuser roller 49. Thus, the toner is fused and fixed to the recording medium. Thereafter, the recording medium on which the image has been formed is discharged onto the paper discharge tray 159 from the upper end 13 of the main conveyance path 41 by the paper discharge roller 15. The temperature of the fuser roller 49 is controlled by the CPU 111 to be the value suitable for the basis weight of the recording medium.

Figure 6:
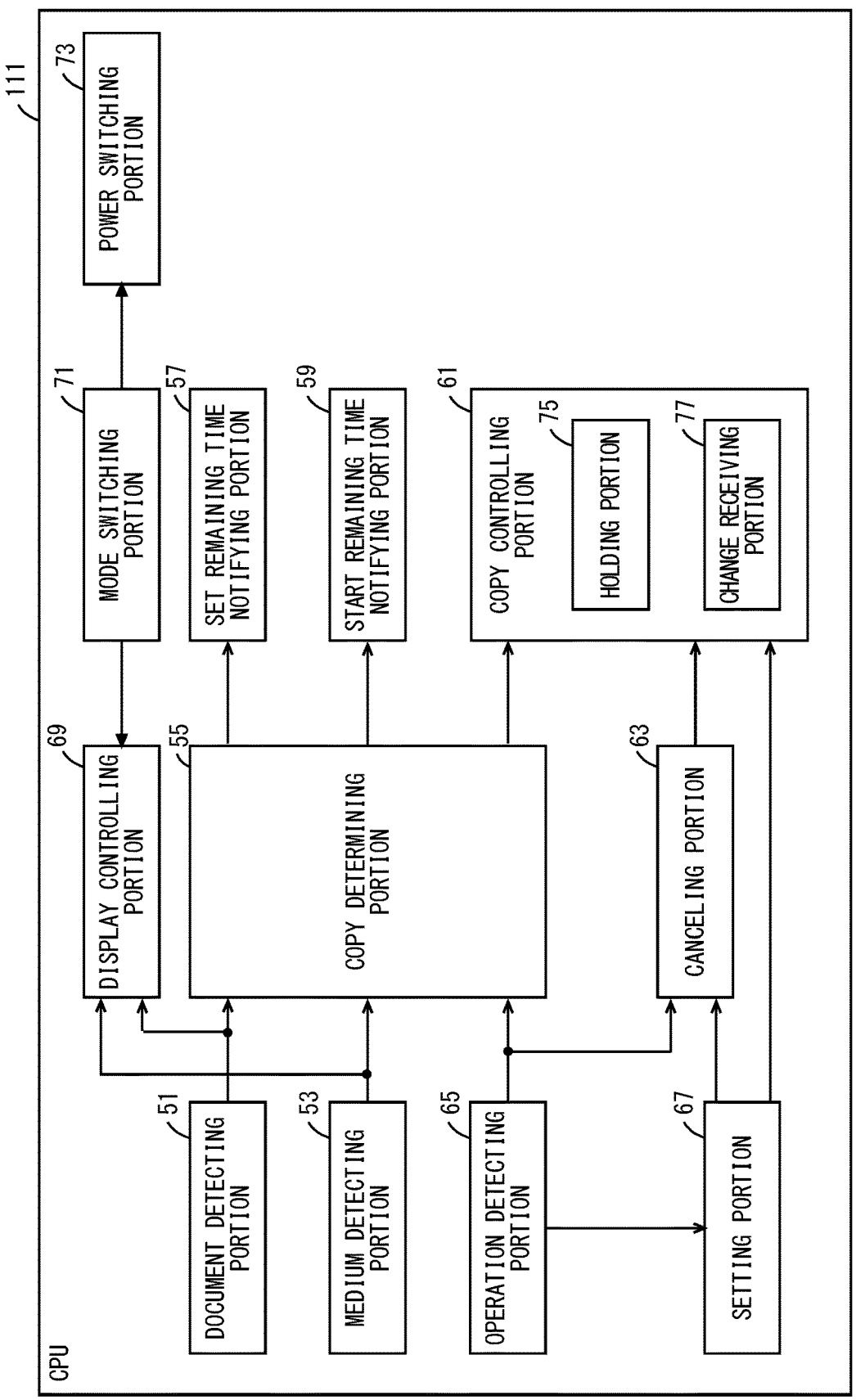
FIG. 6 is a diagram showing one example of functions of a CPU of an MFP in the present embodiment.

FIG. 6 is a diagram showing one example of the functions of the CPU of the MFP in the present embodiment. The functions shown in FIG. 6 are implemented by the CPU 111 in the case where the CPU 111 included in the MFP 100 executes an automatic copy program stored in the ROM 113, the HDD 115 or the CD-ROM 118A. With reference to FIG. 6, the CPU 111 includes a document detecting portion 51, a medium detecting portion 53, a copy determining portion 55, a set remaining time notifying portion 57, a start remaining time notifying portion 59, a copy controlling portion 61, a canceling portion 63, an operation detecting portion 65, a setting portion 67, a display controlling portion 69, a mode switching portion 71 and a power switching portion 73.

The document detecting portion 51 detects a document that is set in the document tray 121 by the user. Specifically, when the document detection sensor 121A mounted on the automatic document feeder 120 outputs an ON signal, a document is detected.

The medium detecting portion 53 detects a paper that is put in the manual paper feed tray 154 by the user. Specifically, when the paper detection sensor 154A is turned ON, a paper is detected. While the medium detecting portion 53 detects a paper that is set in the manual paper feed tray 154 by the user in the present embodiment, a paper that is put in the paper feed trays 151, 152, 153 by the user may be detected. In this case, in the case where detecting opening or closing of the paper feed trays 151, 152, 153 and detecting a paper, the medium detecting portion 53 detects a paper.

The operation detecting portion 65 detects a user's input operation using the operation unit 163 of the operation panel 160. In the case where the operation detected by the operation detecting portion 65 is a setting operation, the setting portion 67 sets a set value for executing a copy operation in accordance with the setting operation.

The copy controlling portion 61 controls the automatic document feeder 120, the document scanning unit 130, the image forming unit 140 and the paper feed unit 150 and executes a copy operation in accordance with a set value that is set by the setting portion 67. A copy operation is an operation of causing the automatic document feeder 120 to convey a document set in the document tray 121 to the document scanning unit 130, causing the document scanning unit 130 to scan an image on a document, causing the image forming unit 140 to convey a paper contained in the paper feed unit 150 to the image forming unit 140 and causing the image forming unit 140 to form an image of image data output from the document scanning unit 130 on a paper conveyed by the paper feed unit 150. A set value set by the setting portion 67 includes a number indicating the number of times a copy operation is to be executed, a set value used for scanning of a document by the document scanning unit 130 and a setting value used for formation of an image of image data on a paper by the image forming unit 140.

In the case where an elapsed period of time between a document detection time when a document is detected by the document detecting portion 51 and a paper detection time when a paper is detected by the medium detecting portion 53 is equal to or smaller than a predetermined operation period of time, the copy determining portion 55 determines to cause the copy controlling portion 61 to automatically execute a copy operation. However, in the case where the operation detecting portion 65 detects a user's input operation after one detection out of detection of a document by the document detecting portion 51 and detection of a paper by the medium detecting portion 53 is made and before the other detection is made, the copy determining portion 55 does not determine to automatically execute a copy operation. In the case where determining to cause the copy controlling portion 61 to automatically execute a copy operation, the copy determining portion 55 outputs a copy instruction to the copy controlling portion 61.

In the case where a paper is detected by the medium detecting portion 53 before an operation period of time elapses since detection of a document by the document detecting portion 51 without detection of a user's operation by the operation detecting portion 65, the copy determining portion 55 determines to cause the copy controlling portion 61 to automatically execute a copy operation. Further, in the case where a document is detected by the document detecting portion 51 before an operation period of time elapses since a paper is detected by the medium detecting portion 53 without detection of a user's operation by the operation detecting portion 65, the copy determining portion 55 determines to cause the copy controlling portion 61 to automatically execute a copy operation.

The set remaining time notifying portion 57 makes notification of a period of time remaining until a period of time that elapses since one detection out of detection of a document by the document detecting portion 51 and detection of a paper by the medium detecting portion 53 is made is equal to an operation period of time as a set remaining period of time. Specifically, the set remaining time notifying portion 57 makes notification of a set remaining period of time by speech. An operation period of time is set in advance by the user. In the case where the setting for automatic execution of a copy operation is set to ON, an operation period of time is settable. In the case where a user's input operation is detected by the operation detecting portion 65 after one detection out of detection of a document by the document detecting portion 51 and detection of a paper by the medium detecting portion 53 is made and before the other detection is made, the set remaining time notifying portion 57 cancels notification of a set remaining period of time. The set remaining time notifying portion 57 may make notification of a set remaining period of time using an LED provided in the operation panel 160 or may display the set remaining period of time in the display unit 161.

Specifically, when automatic execution of a copy operation is not determined by the copy determining portion 55, the set remaining time notifying portion 57 makes notification of a set remaining period of time which is a period of time remaining until a period of time that elapses since a document is detected by the document detecting portion 51 without detection of a user's operation by the operation detecting portion 65 becomes equal to an operation period of time. In the case where a user's operation is detected by the operation detecting portion 65 or a paper is detected by the medium detecting portion 53 before an operation period of time elapses since a document is detected by the document detecting portion 51, the set remaining time notifying portion 57 cancels notification of a set remaining period of time. Further, when automatic execution of a copy operation is not determined by the copy determining portion 55, the set remaining time notifying portion 57 makes notification of a set remaining period of time which is a period of time remaining until a period of time that elapses from detection of a paper by the medium detecting portion 53 without detection of a user's operation by the operation detecting portion 65 becomes equal to an operation period of time. The set remaining time notifying portion 57 cancels notification of a set remaining period of time in the case where a user's operation is detected by the operation detecting portion 65 or a document is detected by the document detecting portion 51 before an operation period of time elapses since detection of a paper by the medium detecting portion 53.

The start remaining time notifying portion 59 makes notification of a period of time remaining until a period of time that elapses since determination of automatic execution of a copy operation by the copy determining portion 55 without detection of a user's operation by the operation detecting portion 65 becomes equal to a predetermined grace period of time as a start remaining period of time. A grace period of time is preset by the user. In the case where the setting for automatic execution of a copy operation is set to ON, a grace period of time is settable. Specifically, the start remaining time notifying portion 59 makes notification of a start remaining period of time by speech. In the case where a user's input operation is detected by the operation detecting portion 65 after automatic execution of a copy operation is determined by the copy determining portion 55, the start remaining time notifying portion 59 cancels notification of a start remaining period of time. The start remaining time notifying portion 59 may make notification of a start remaining period of time using an LED provided in the operation panel 160 or may display a start remaining period of time in the display unit 161.

In the case where a predetermined condition is satisfied when automatic execution of a copy operation is determined by the copy determining portion 55, the canceling portion 63 cancels determination of automatic execution of a copy operation by the copy determining portion 55. In the case where canceling determination of automatic execution of a copy operation by the copy determining portion 55, the canceling portion 63 outputs a cancel instruction to the copy controlling portion 61.

Figure 7:
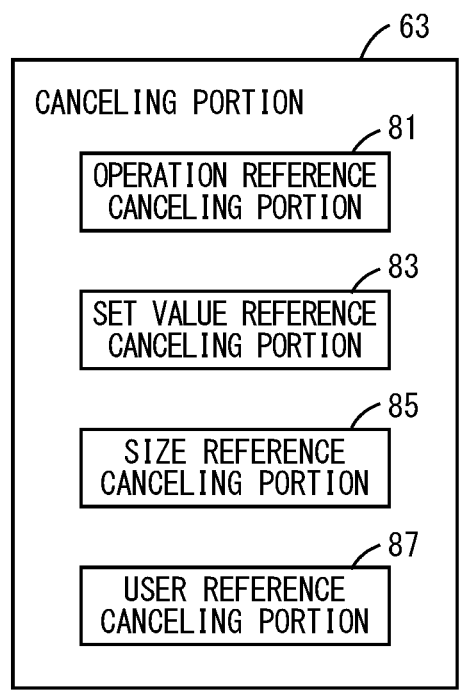
FIG. 7 is a block diagram showing one example of the detailed functions of a canceling portion.

FIG. 7 is a block diagram showing one example of the detailed functions of the canceling portion. With reference to FIG. 7, the canceling portion 63 includes an operation reference canceling portion 81, a set value reference canceling portion 83, a size reference canceling portion 85 and a user reference canceling portion 87.

In the case where a user's operation is detected by the operation detecting portion 65 before a grace period of time elapses since automatic execution of a copy operation is determined by the copy determining portion 55, the operation reference canceling portion 81 cancels determination of automatic execution of a copy operation by the copy determining portion 55. When automatic execution of a copy operation is determined by the copy determining portion 55, a set value that is set by the setting portion 67 and is to be used for automatic execution of the copy operation is a predetermined default value. Thus, the user can change the set value to a set value different from the default value before the grace period of time elapses.

When automatic execution of a copy operation is determined by the copy determining portion 55, in the case where a set value that is set by the setting portion 67 and is to be used for automatic execution of the copy operation is different from the predetermined default value, the set value reference canceling portion 83 cancels determination of automatic execution of the copy operation by the copy determining portion 55. In the case where a set value different from the default value is set, a user different from a user who has set a document and a paper in the MFP 100 may be operating the operation panel 160. Thus, execution of a job with the setting set by a different user can have higher priority.

In the case where a document size detected by the document detecting portion 51 is different from a paper size detected by the medium detecting portion 53, the size reference canceling portion 85 cancels determination of automatic execution of a copy operation by the copy determining portion 55. In the case where a document size and a paper size are different, there are a plurality of combinations of set values for execution of a process of processing an image to be formed on a paper. Thus, a copy operation can be prevented from being executed automatically, and the user can select from the plurality of combinations of set values.

In the case where a user who has set a document detected by the document detecting portion 51 in the document tray 121 and a user who has set a paper detected by the medium detecting portion 53 in the manual paper feed tray 154 are different, the user reference canceling portion 87 cancels determination of automatic execution of a copy operation by the copy determining portion 55. The MFP 100 includes a camera and identifies a user who has set a document in the document tray 121 and identifies a user who has set a paper in the manual paper feed tray 154 by analyzing images obtained and picked up by the camera.

In the case where a copy instruction is input from the copy determining portion 55, the copy controlling portion 61 executes a copy operation in accordance with a set value that is set by the setting portion 67 if a cancel instruction is not input from the canceling portion 63. The copy controlling portion 61 includes a holding portion 75 and a change receiving portion 77. When a copy instruction is input by the copy determining portion 55, in the case where the communication I/F unit 112 has received a print job including print data and an image forming condition or the case where a print job received by the communication I/F unit 112 is stored in the HDD 115, the holding portion 75 holds automatic execution of a copy operation. After a print job that has been received by the communication I/F unit 112 is executed, and an image of print data included in the print job is formed in accordance with an image forming condition included in the print job, the holding portion 75 sets a set value to a default value and cancels holding of automatic execution of the copy operation. The copy controlling portion 61 automatically executes a copy operation in accordance with a default set value that is set by the setting portion 67 in response to cancellation of holding of automatic execution of the copy operation. Thus, a print job that has been received by the communication I/F unit 112 is given higher priority for execution.

In the case where a set value for execution of an image forming operation which is part of a copy operation is changed by the setting portion 67 in the middle of automatic execution of the copy operation, the change receiving portion 77 receives a set value that has been changed by the setting portion 67. The change receiving portion 77 updates a set value with the changed set value that is received from the setting portion 67. In the case where a changed set value has been received by the change receiving portion 77 after one copy operation is completed, the copy controlling portion 61 executes an image forming operation again in accordance with the changed set value. For example, in the case where the setting portion 67 changes a set value for the item "number" indicating the number of copies, an image forming operation is repeatedly executed the number of times defined by the set value that is set in the item "number."

Here, "1" is set as a default value in the item "number," by way of example In response to input of a copy instruction, the copy controlling portion 61 starts the first copy operation. In the case where "3" is set in the item "number" by the setting portion 67 during execution of the first copy operation, the copy controlling portion 61 executes the second and third image forming operations after execution of the first copy operation. Because a document scanning process of scanning a document is executed in the first copy operation, a document scanning process is not executed in the second and third copy operations. Because image data that is obtained by scanning of a document obtained in the document scanning process in the first copy operation is stored in the RAM 114, an image forming operation of forming an image of image data stored in the RAM 114 on a paper is executed in the second and third copy operations.

The mode switching portion 71 switches the operation mode of the MFP 100 to a normal mode or a power saving mode that causes less power consumption. The mode switching portion 71 sets the operation mode to the normal mode in response to the main power supply of the MFP 100 being turned ON. When a predetermined power saving condition is satisfied with the operation mode being switched to the normal mode, the mode switching portion 71 switches the operation mode to the power saving mode. The power saving condition includes the case where a predetermined period of time elapses without a user's input operation and the case where the user inputs an operation of providing an instruction of changing the operation mode to the power saving mode, for example. When a predetermined recovery condition is satisfied with the operation mode being switched to the power saving mode, the mode switching portion 71 switches the operation mode to the normal mode. The recovery condition includes the case where the user inputs an operation to the operation panel 160, the case where a document is detected by the document detecting portion 51 or the case where a paper is detected by the medium detecting portion 53, for example.

The power switching portion 73 switches the power to be supplied to the hardware resources of the MFP 100. The hardware resources include the communication I/F unit 112, the HDD 115, the facsimile unit 116, the external storage device 118, the automatic document feeder 120, the document scanning unit 130, the image forming unit 140, the paper feed unit 150 and the operation panel 160. In the case where the operation mode is switched from the normal mode to the power saving mode by the mode switching portion 71, the power switching portion 73 disconnects the power to be supplied to the HDD 115, the facsimile unit 116, the external storage device 118, the automatic document feeder 120, the document scanning unit 130, the image forming unit 140, the paper feed unit 150 and the operation panel 160. In the case where the mode switching portion 71 switches the operation mode from the power saving mode to the normal mode, the power switching portion 73 supplies power to the HDD 115, the facsimile unit 116, the external storage device 118, the automatic document feeder 120, the image forming unit 140, the paper feed unit 150 and the operation panel 160.

The display controlling portion 69 controls the display unit 161 and causes the display unit 161 to display an image. With the operation mode in the power saving mode, power is supplied to the display unit 161 by the power switching portion 73 in response to detection of a document by the document detecting portion 51 or in response to detection of a paper by the medium detecting portion 53. However, the display controlling portion 69 does not cause the display unit 161 to display an image. Further, in the case where the copy determining portion 55 determines to cause the copy controlling portion 61 to automatically execute a copy operation, an image is not displayed in the display unit 161 during automatic execution of the copy operation by the copy controlling portion 61. Therefore, with the operation mode in the power saving mode, in the case where a document is detected by the document detecting portion 51 or a paper is detected by the medium detecting portion 53, power is supplied to the display unit 161 by the power switching portion 73. However, an image is not displayed in the display unit 161 by the display controlling portion 69, power consumption of the display unit 161 can be reduced. In the case where the set remaining time notifying portion 57 displays a remaining period of time in the display unit 161, or the case where the start remaining time notifying portion 59 displays a start remaining period of time in the display unit 161, the display controlling portion 69 does not function.

Figure 8:
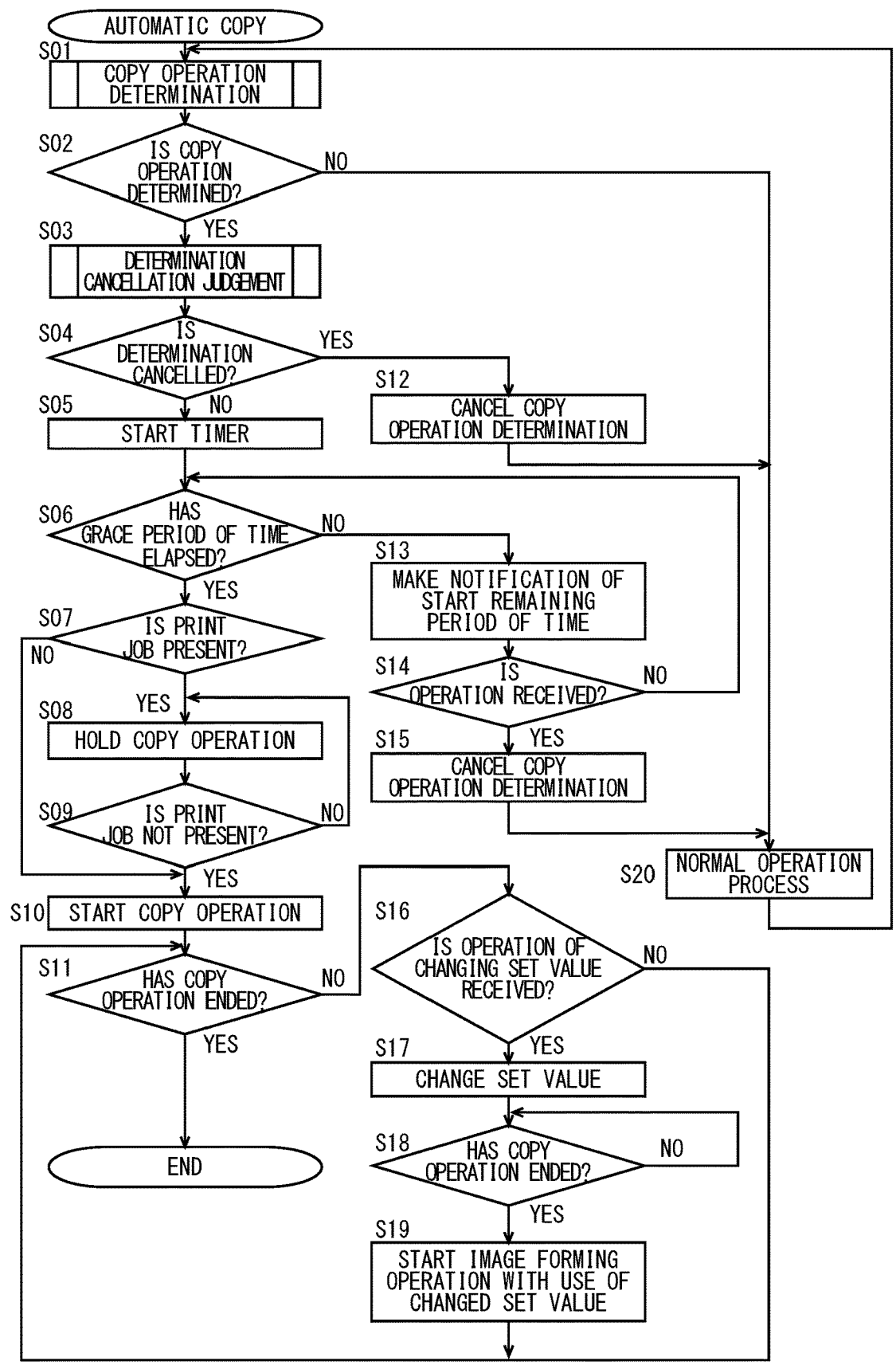
FIG. 8 is a flowchart showing one example of a flow of an automatic copy process.

FIG. 8 is a flowchart showing one example of a flow of an automatic copy process. The automatic copy process is a process executed by the CPU 111 in the case where the CPU 111 included in the MFP 100 executes the automatic copy program stored in the ROM 113, the HDD 115 or the CD-ROM 118A.

With reference to FIG. 8, the CPU 111 included in the MFP 100 executes a copy operation determining process (step S01). Although being described in details below, the copy operation determining process is a process of determining whether a copy operation is to be automatically executed. In the step S02, the CPU 111 branches the process in accordance with a result of execution of the copy operation determining process. In the case where the result of execution of the copy operation determining process indicates that a copy operation is to be automatically executed, the process proceeds to the step S03. If not, the process proceeds to the step S20. In the step S20, a normal operation is executed, and the process returns to the step S01. The normal operation is an operation of receiving a user's input operation using the operation panel 160 and executing a process in accordance with the received operation.

In the step S03, a determination cancel judgment process is executed, and the process proceeds to the step S04. Although being described in details, the determination cancel judgment process is a process of judging whether determination of automatic execution of a copy operation is to be canceled. In the step S04, the CPU 111 branches the process in accordance with a result of execution of the determination cancel judgment process. In the case where a result of execution of the determination cancel judgment process indicates cancellation of determination of automatic execution of a copy operation, the process proceeds to the step S12. If not, the process proceeds to the step S05. In the step S12, determination for automatic execution of a copy operation is canceled, and the process proceeds to the step S20.

In the step S05, the timer is started, and the process proceeds to the step S06. A period of time that elapses since automatic execution of a copy operation is determined is measured by the timer. In the step S06, whether a grace period of time has elapsed is determined. In the case where the grace period of time has elapsed since automatic execution of a copy operation is determined, the process proceeds to the step S07. If not, the process proceeds to the step S13. In the step S13, notification of a start remaining period of time is made, and the process proceeds to the step S14. A start remaining period of time is a period of time remaining until a period of time that elapses since determination of automatic execution of a copy operation becomes equal to the grace period of time. Specifically, a value obtained when a timer value is subtracted from the grace period of time is a start remaining period of time.

In the step S14, whether an operation is received is determined. In the case where a user's operation is received, the process proceeds to the step S15. If not, the process returns to the step S06. In the step S15, determination of automatic execution of a copy operation is canceled, and the process proceeds to the step S20.

In the step S07, whether a print job is present is determined. In the case where the communication I/F unit 112 is receiving a print job or the case where a print job that has already been received by the communication I/F unit 112 is stored in the HDD 115, it is determined that a print job is present. If a print job is present, the process proceeds to the step S10. If not, the process proceeds to the step S08.

In the step S08, automatic execution of a copy operation is held, and the process proceeds to the step S09. In the step S09, whether a print job is not present is determined. If a print job is not present, the process proceeds to the step S10. If a print job is present, the process returns to the step S08.

In the step S10, a copy operation is started, and the process proceeds to the step S11. In the step S11, whether a copy operation has ended is determined. If a copy operation has ended, the process ends. If not, the process proceeds to the step S16. In the step S16, whether an operation of changing the setting has been received is determined. If an operation of changing a set value is received, the process proceeds to the step S17. If not, the process returns to the step S11.

In the step S17, a changed set value is set, and the process proceeds to the step S18. In the step S18, whether a copy operation has ended is determined. The process waits until the copy operation ends (NO in the step S18). If the copy operation has ended (YES in the step S18), the process proceeds to the step S19. In the step S19, an image forming operation included in the copy operation starts in accordance with the changed set value, and the process returns to the step S11. Because a first copy operation is executed in the step S10, second and subsequent copy operations are executed in the step S18. In the first copy operation, a document scanning process is executed, and image data obtained by scanning of a document is stored in the RAM 114. In the second and subsequent copy operations executed in the step S18, a document scanning process is not executed, and an image forming process is executed with use of image data stored in the RAM 114 when the first copy operation is executed.

Figure 9:
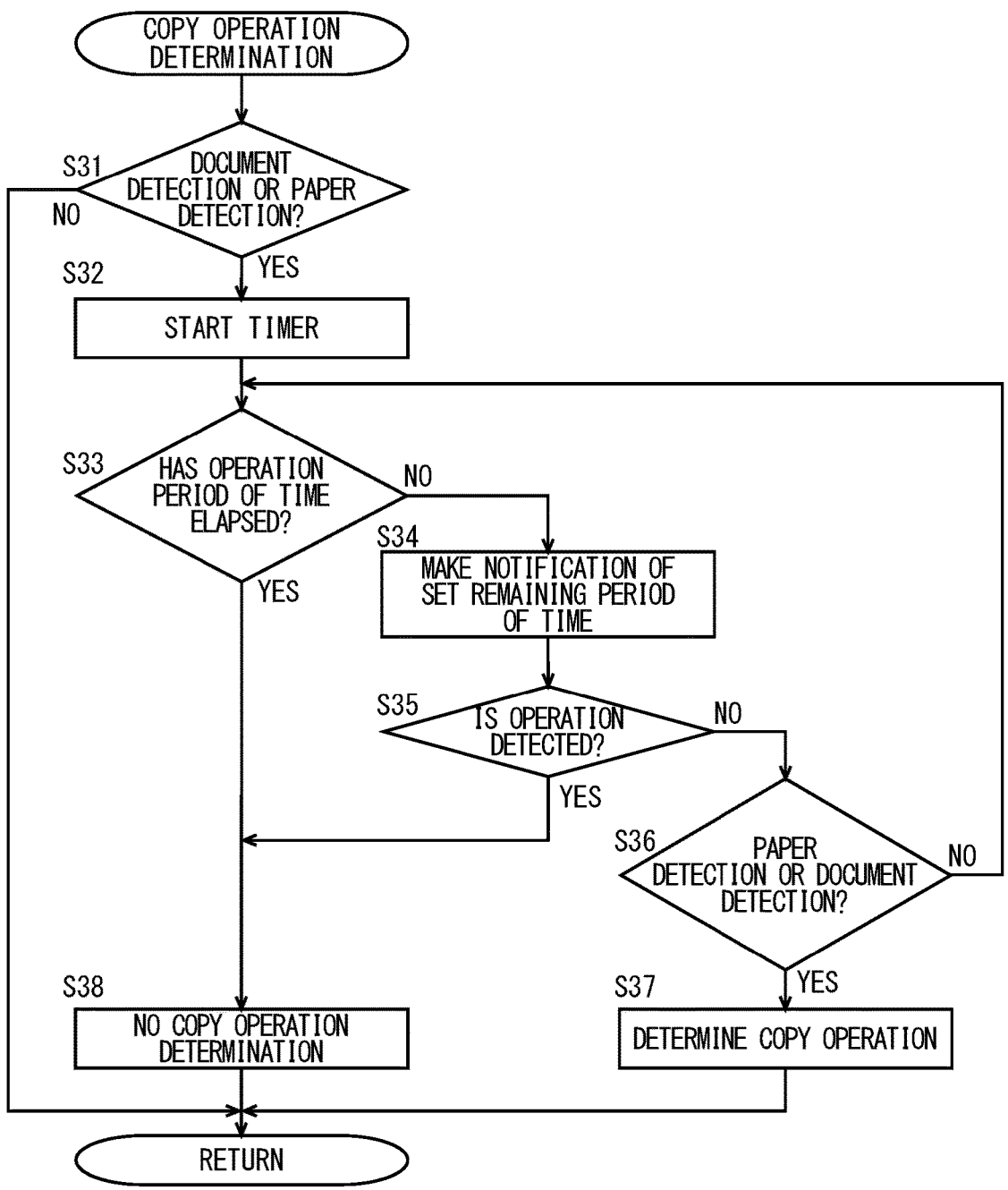
FIG. 9 is a flowchart showing one example of a flow of a copy operation determining process.

FIG. 9 is a flowchart showing one example of a flow of a copy operation determining process. The copy operation determining process is a process executed in the step S01 of an automatic copy process. With reference to FIG. 9, the CPU 111 included in the MFP 100 determines whether a document or a paper has been detected (step S31). If a document or a paper is detected, the process proceeds to the step S32. If not, the process returns to the automatic copy process. In the step S32, the timer is started. A period of time that elapses since a document or a paper is detected is measured by the timer.

In the step S33, whether an operation period of time has elapsed is determined. If the operation period of time has elapsed since a document or a paper is detected, the process proceeds to the step S38. If not, the process proceeds to the step S34. In the step S38, it is determined that a copy operation is not to be executed, and the process returns to the automatic copy process.

In the step S34, notification of a set remaining period of time is made, and the process proceeds to the step S35. The set remaining period of time is a period of time remaining until a period of time that elapses since a document or a paper is detected becomes equal to the operation period of time. Specifically, a value obtained when a timer value is subtracted from the operation period of time is a set remaining period of time.

In the step S35, whether an operation is received is determined. If a user's input operation is received, the process proceeds to the step S38. If not, the process proceeds to the step S36. In the step S36, whether a paper or a document is detected is determined. In the case where a document is detected in the step S31, whether a paper is detected is determined in the step S36. In the case where a paper is detected in the step S31, whether a document is detected is determined in the step S36. If a document or a paper is detected, the process proceeds to the step S37. If not, the process returns to the step S33. In the step S37, automatic execution of a copy operation is determined, and the process returns to the automatic copy process.

Figure 10:
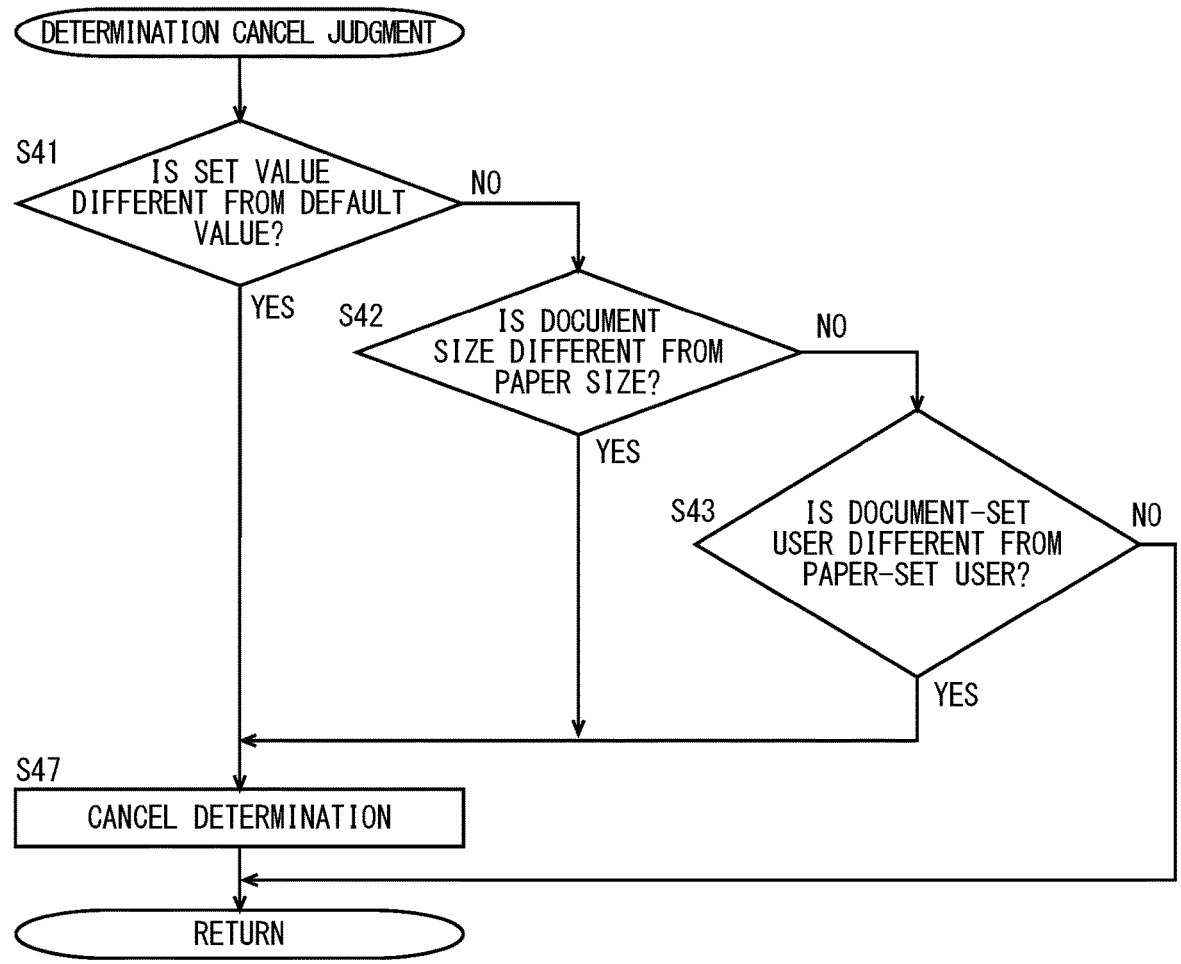
FIG. 10 is a flowchart showing one example of a flow of a determination cancel judgment process.

FIG. 10 is a flowchart showing one example of a flow of a determination cancel judgment process. With reference to FIG. 10, in the step S41, whether a set value is different from a default value is determined.

If a set value is different from the default defined value, the process proceeds to the step S47. If not, the process proceeds to the step S42. In the step S42, whether a document size is different from a paper size is determined. If the document size is different from the paper size, the process proceeds to the step S47. If not, the process proceeds to the step S43. In the step S43, whether a user who has set a document is different from a user who has set a paper is determined. If the user who has set the document is different from the user who has set the paper, the process proceeds to the step S47. If not, the process returns to the automatic copy process.

As described above, the MFP 100 in the present embodiment functions as an image forming apparatus. In the case where the CPU 111 detects a paper contained in the manual paper feed tray 154 and detects a document set in the document tray 121, and an elapsed period of time between a document detection time when a document is detected and a medium detection time when a paper is detected is equal to or smaller than a predetermined operation period of time, the CPU 111 automatically executes a copy operation. Therefore, because an image of the document set in the document tray 121 is formed on a paper that is put in the manual paper feed tray 154 by the user, the user is not required to perform an operation of providing an instruction for starting a copy operation and an operation of inputting a set value for designating a paper on which an image is to be formed to the operation panel 160. Therefore, the user can execute the copy operation without inputting a set value to the MFP 100.

Further, in the case where a document is detected before an operation period of time elapses since detection of a paper, the CPU 111 included in the MFP 100 determines to automatically execute a copy operation. Therefore, since the user only has to set a document in the document tray 121 by the time an operation period of time elapses since a paper is put in the manual paper feed tray 154, a period of time required for preparation of a document to be set in the document tray 121 can be ensured.

Further, in the case where a paper is detected before an operation period of time elapses since a document is detected, the CPU 111 included in the MFP 100 determines to automatically execute a copy operation. Therefore, since the user only has to put a paper in the manual paper feed tray 154 by the time an operation period of time elapses since a document is set in the document tray 121, a period of time required for selection or preparation of a paper to be put in the manual paper feed tray 154 can be ensured.

Further, the CPU 111 included in the MFP 100 makes notification of a period of time remaining until a period of time that elapses since one detection out of detection of a document and detection of a paper is made becomes equal to the operation period of time as a set remaining period of time. Thus, the user can adjust a period of time required for work of setting a document in the document tray 121 or work of putting a paper in the manual paper feed tray 154.

Further, in the case where a user's input operation is detected after one detection out of detection of a document and detection of a paper is made and before the other detection is made, the CPU 111 included in the MFP 100 does not determine to automatically execute a copy operation. Therefore, if the user performs an operation in the operation period of time, a copy operation can be prevented from being executed.

Further, in the case where a user's input operation is detected before a grace period of time elapses since execution of a copy operation is determined, the CPU 111 included in the MFP 100 cancels determination of automatic execution of a copy operation. Further, the CPU 111 automatically executes a copy operation in response to an elapse of a grace period of time without detection of a user's input operation since automatic execution of the copy operation is determined. Thus, the user can perform an operation to execute a copy operation after setting a document in the document tray 121 and putting a paper in the manual paper feed tray 154.

Further, the CPU 111 included in the MFP 100 makes notification of a period of time remaining until a period of time that elapses since determination of automatic execution of a copy operation becomes equal to the grace period of time as a start remaining period of time. Therefore, a period of time required for the user to determine whether a copy operation is to be automatically executed can be ensured.

Further, in the case where receiving a change of a set value for execution of an image forming operation which is part of a copy operation during automatic execution of the copy operation, the CPU 111 included in the MFP 100 executes the image forming operation in accordance with the changed set value. Therefore, it is possible to change a set value for an image forming operation that is set as a default value.

Further, in the case where a set value that is set for automatic execution of a copy operation at a point in time at which automatic execution of the copy operation is determined is different from a default set value, the CPU 111 included in the MFP 100 cancels determination of automatic execution of a copy operation. Therefore, a copy operation can be prevented from being automatically executed with a set value for automatic execution of the copy operation being different from a default set value.

Further, in the case where a detected document size is different from a detected paper size at a point in time at which automatic execution of a copy operation is determined, the CPU 111 included in the MFP 100 cancels determination of automatic execution of the copy operation. Therefore, the copy operation to be executed automatically can be limited to the case where an image having the same size as an image formed on a document is to be formed on a paper.

Further, in the case where a user who has set a document in the document tray is different from a user who has put a paper in the manual paper feed tray 154 at a point in time at which automatic execution of a copy operation is determined, the CPU 111 included in the MFP 100 cancels determination of automatic execution of the copy operation. Therefore, in the case where a user who has set a document in the document tray 121 and a user who has put a paper in the manual paper feed tray 154 are the same, the copy operation can be executed automatically. In the case where they are different, the copy operation can be prevented from being automatically executed.

Further, in the case where automatic execution of a copy operation is determined, and a print job is being received or a print job is stored in the HDD 115, the CPU 111 included in the MFP 100 does not execute the copy operation. Therefore, a print job that is being received or a print job that has been received and stored in the HDD 115 can be given priority over a copy operation for execution.

Further, the CPU 111 included in the MFP 100 does not automatically execute a copy operation even when a paper is contained in the paper feed tray 151, 152, 153. Therefore, the user only has to put a paper in the manual paper feed tray 154 in order to automatically execute a copy operation, so that it is easy to provide an instruction for executing the copy operation. Further, the user can determine whether a copy operation is to be automatically executed by selecting one of the paper feed trays 151, 152, 153 and the manual paper feed tray 154.

Further, with the operation mode in the power saving mode, in the case where the operation mode is switched to the normal mode in response to detection of a document or detection of a paper, the CPU 111 included in the MFP 100 does not display an image in the display unit 161. On top of that, in the case where the automatic execution of the copy operation is determined in the CPU 111, the CPU 111 included in the MFP 100 does not cause the display unit 161 to display an image during automatic execution of the copy operation. Thus, power to be consumed by the display unit 161 can be reduced.

Modified Example

When a copy instruction is input from the copy determining portion 55, in the case where a print job is being received or a print job is stored in the HDD 115, the holding portion 75 holds execution of a copy operation. However, the holding portion 75 may cancel determination of automatic execution of the copy operation. Thus, it is not necessary to wait until a print job is executed.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image forming apparatus comprising:
   a document tray in which a document is to be set;
   a medium container that contains a recording medium;
   a document detection sensor that detects a document set in the document tray;
   a medium detection sensor that detects a recording medium contained in the medium container; and
   a hardware processor, wherein the hardware processor
   executes a copy operation of forming an image of image data obtained by scanning of a document set in the document tray on a recording medium contained in the medium container,
   determines to automatically execute the copy operation in the case where an elapsed period of time between a document detection time when a document is detected by the document detection sensor and a medium detection time when a recording medium is detected by the medium detection sensor is equal to or smaller than a predetermined operation period of time, and
   automatically executes the copy operation based on determination of automatic execution of the copy operation.

2. The image forming apparatus according to claim 1, wherein
   the hardware processor determines to automatically execute the copy operation in the case where a document is detected by the document detection sensor before the operation period of time elapses since a recording medium is detected by the medium detection sensor.

3. The image forming apparatus according to claim 1, wherein
   the hardware processor determines to automatically execute the copy operation in the case where a recording medium is detected by the medium detection sensor before the operation period of time elapses since a document is detected by the document detection sensor.

4. The image forming apparatus according to claim 1, wherein
   the hardware processor further makes notification of a period of time remaining until a period of time that elapses since one detection out of detection of a document by the document detection sensor and detection of a recording medium by the medium detection sensor is made becomes equal to the operation period of time as a set remaining period of time.

5. The image forming apparatus according to claim 1, further comprising:
   an operation detector that detects an operation that is input by a user, wherein
   the hardware processor does not determine to automatically execute the copy operation in the case where an operation is detected by the operation detector after one detection out of detection of a document by the document detection sensor and detection of a recording medium by the medium detection sensor is made and before another detection is made.

6. The image forming apparatus according to claim 5, wherein
   the hardware processor
   further cancels determination of automatic execution of the copy operation in the case where an operation is detected by the operation detector before a predetermined grace period of time elapses since automatic execution of the copy operation is determined, and
   automatically executes the copy operation in response to an elapse of the grace period of time without detection of an operation by the operation detector since automatic execution of the copy operation is determined.

7. The image forming apparatus according to claim 6, wherein
   the hardware processor further makes notification of a period of time remaining until a period of time that elapses since automatic execution of the copy operation is determined becomes equal to the grace period of time as a start remaining period of time.

8. The image forming apparatus according to claim 1, wherein
   the hardware processor further
   receives a change of a set value for execution of an image forming operation that is part of the copy operation during automatic execution of the copy operation, and
   executes the image forming operation in accordance with the received and changed set value.

9. The image forming apparatus according to claim 1, wherein
   the hardware processor
   further sets a set value for automatic execution of the copy operation, and
   cancels determination of automatic execution of the copy operation in the case where a set value that is set for automatic execution of the copy operation at a point in time at which automatic execution of the copy operation is determined is different from a default set value.

10. The image forming apparatus according to claim 1, further comprising:
    a document-size detection sensor that detects a size of a document to be set in the document tray; and
    a medium-size detection sensor that detects a size of a recording medium to be contained in the medium container, wherein
    the hardware processor further cancels determination of automatic execution of the copy operation in the case where a size of a document detected by the document-size detection sensor and a size of a recording medium detected by the medium-size detection sensor are different from each other at a point in time at which automatic execution of the copy operation is determined.

11. The image forming apparatus according to claim 1, wherein
the hardware processor further
identifies a user, and
cancels determination of automatic execution of the copy operation in the case where a user who has set a document in the document tray and is identified by identification of the user and a user who has put a recording medium in the medium container and is identified by identification of the user are different at a point in time at which automatic execution of the copy operation is determined.

12. The image forming apparatus according to claim 1, wherein
the hardware processor
further receives a print job from outside and stores the print job in a storage, and does not automatically execute the copy operation in the case where automatic execution of the copy operation is determined, and the print job is being received or the print job is stored in the storage.

13. The image forming apparatus according to claim 1, wherein
the medium container includes a fixed container for which a size and an orientation of a paper to be contained are defined and an undecided container for which a size or an orientation of a paper to be contained is not defined, and
the hardware processor further determines a point in time at which a recording medium contained in the undecided container is detected by the medium detection sensor as the medium detection time.

14. The image forming apparatus according to claim 13, wherein
the hardware processor does not determine the medium detection time even in the case where a recording medium contained in the fixed container is detected by the medium detection sensor.

15. The image forming apparatus according to claim 1, further comprising a display that displays an image, wherein
the hardware processor
switches an operation mode between a normal mode and a power saving mode in which power consumption is smaller than power consumption in the normal mode,
disconnects power to be supplied to the display in the case where the operation mode is in the power saving mode,
supplies power to the display in the case where the operation mode is in the normal mode, and
does not cause the display to display an image in the display even in the case where the operation mode is switched from the power saving mode to the normal mode in response to detection of a document by the document detection sensor or detection of a recording medium by the medium detection sensor with the operation mode in the power saving mode, and on top of that, in the case where automatic execution of the copy operation is determined, does not cause the display to display an image during automatic execution of the copy operation.

16. An automatic copy method to be executed in an image forming apparatus,
the image forming apparatus comprising:
a document tray in which a document is to be set;
a medium container that is to contain a recording medium; and
a hardware processor that executes a copy operation of forming an image of image data obtained by scanning of a document that is set in the document tray on a recording medium contained in the medium container, and
the automatic copy method including:
a document detection step of detecting a document set in the document tray;
a medium detection step of detecting a recording medium contained in the medium container; and
a copy determination step of determining automatic execution of the copy operation in the case where an elapsed period of time between a document detection time when a document is detected in the document detection step and a medium detection time when a recording medium is detected in the medium detection step is equal to or smaller than a predetermined operation period of time, wherein
a copy control step includes automatic execution of a copy operation based on determination in the copy determination step.

17. A non-transitory computer readable recording medium encoded with an automatic copy program to be executed in a computer controlling an image forming apparatus,
the image forming apparatus comprising:
a document tray in which a document is to be set; and
a medium container that is to contain a recording medium, and the automatic copy program causing the computer to execute:
a copy control step of executing a copy operation of forming an image of image data obtained by scanning of a document that is set in the document tray on a recording medium contained in the medium container,
a document detection step of detecting a document set in the document tray;
a medium detection step of detecting a recording medium contained in the medium container; and
a copy determination step of determining automatic execution of the copy operation in the case where an elapsed period of time between a document detection time when a document is detected in the document detection step and a medium detection time when a recording medium is detected in the medium detection step is equal to or smaller than a predetermined operation period of time, wherein
a copy control step includes automatic executing a copy operation based on determination in the copy determination step.

* * * * *